United States Patent [19]
Sorensen

[11] Patent Number: 4,807,775
[45] Date of Patent: Feb. 28, 1989

[54] INJECTION MOLDING OF THIN-WALLED PLASTIC PRODUCTS

[75] Inventor: Jens O. Sorensen, Rancho Santa Fe, Calif.

[73] Assignee: Acebo Company, La Jolla, Calif.

[21] Appl. No.: 27,511

[22] Filed: Mar. 18, 1987

Related U.S. Application Data

[63] Continuation-in-part of Ser. No. 7,463, Jan. 26, 1987, Pat. No. 4,369,519.

[51] Int. Cl.$^4$ .............................................. B65D 25/00
[52] U.S. Cl. ........................................ 220/72; 220/83; 229/1.5 B
[58] Field of Search ................. 229/1.5 B; 220/72, 83

[56]  References Cited
U.S. PATENT DOCUMENTS

| | | | |
|---|---|---|---|
| 2,859,557 | 11/1958 | Lattuca | 220/72 X |
| 3,070,275 | 12/1962 | Bostrom | 229/1.5 B |
| 3,194,468 | 7/1965 | Baron | 229/1.5 B |
| 3,237,834 | 3/1966 | Davis et al. | 229/1.5 B |
| 3,606,262 | 9/1971 | Van't Hoff | 229/1.5 B X |
| 3,944,124 | 3/1976 | Hexel | 229/1.5 B |

Primary Examiner—Steven M. Pollard
Attorney, Agent, or Firm—Edward W. Callan

[57] ABSTRACT

An injection-molded, thin-walled, plastic product is formed by a mold cavity having a thin-cavity region; a pair of flow channels, which are thicker than the thin-cavity region for directing injected plastic into the thin-cavity region; and a meld chamber, which is thicker than the thin cavity region, is displaced from the flow channels, and is at least partially located extensively between the flow channels for melding plastic flowing together from different directions. The product includes a thin-walled area formed by the thin-cavity region; first and second ribs formed by the pair of flow channels, with the first and second ribs being thicker than the thin-walled area; and a third rib formed by the meld chamber, wherein the third rib is displaced from the first and second ribs and is at least partially located extensively between the first and second ribs, with the third rib being thicker than the thin-walled area. Products that are injection molded to include a rib formed by a meld chamber that is so located have enhanced flexure strength in the portion of the product between the ribs formed by the flow channels.

7 Claims, 3 Drawing Sheets

INJECTION MOLDING OF THIN-WALLED PLASTIC PRODUCTS

This is a continuation-in-part of Application Ser. No. 007,463 filed Jan. 26, 1987, now U.S. Pat. No. 4,369,519.

BACKGROUND OF THE INVENTION

The present invention generally pertains to injection molding of thin-walled plastic products and is particularly directed to enhancing the strength of thin-walled plastic products.

A prior art mold for molding thin-walled plastic products having a thin-walled area includes a first mold part and a second mold part defining a mold cavity therebetween, encompassed by a parting line, for forming the plastic product, and further defining a gate for admitting injected molten plastic into the cavity. The mold parts define a thin cavity region for defining the thin-walled area of the plastic product; and first and second flow channels, defining opposite boundaries of the thin cavity region, and for directing the injected molten plastic from the gate into the thin cavity region, whereby the molten plastic directed from the first flow channel joins with the molten plastic directed from the second flwo channel. A "flow channel" is defined as a portion of the mold cavity which directs the flow of molten plastic. Thin-walled plastic products made with such molds are structurally weak, especially in the regions where the molten plastic directed from the first flow channel joins with the molten plastic directed from the second flow channel.

SUMMARY OF THE INVENTION

The present invention provides an improved thin-walled plastic product made with a mold of the type described above.

The product of the present invention is made with mold parts that further define a meld chamber, which is portion of the mold cavity that is thicker than the thin cavity region to enhance the melding of plastic flowing from different directions into and joining together in the meld chamber, wherein the thickest portion of the meld chamber is displaced from the gate. The meld chamber is located where molten plastic directed into the thin cavity region by the first flow channel joins molten plastic directed into the thin cavity region by the second flow channel, whereby the strength of the molded thin-walled plastic product is significantly enhanced, particularly in the region of the product defined by the meld chamber.

In one aspect, the product of the present invention is an injection-molded, hollow, thin-walled, plastic product formed by a mold cavity having a thin-cavity region; a pair of flow channels, which are thicker than the thin-cavity region for directing injected plastic into the thin-cavity region; and a meld chamber, which is thicker than the thin cavity region, is displaced from the flow channels, and is at least partially located extensively between the flow channels for melding plastic flowing together from different directions. The injection-molded product of the present invention includes a thin-walled area formed by the thin-cavity region; first and second ribs formed by the pair of flow channels, the first and second ribs being thicker than the thin-walled area; and a third rib formed by the meld chamber, wherein the third rib is displaced from the first and second ribs and is at least partially located extensively between the first and second ribs, with the third rib being thicker than the thin-walled area.

It has been discovered that within the area of the wall between a pair of the ribs, the flexure strength is greater in a direction normal to a line that is generally aligned with the direction of the pair of ribs than in a direction parallel to said line. The greatest flexure strength within such area is in the direction defined by the flow of the molten plastic toward the meld chamber within the meld cavity.

Within the ribs defined by the meld chambers, the flexure strength is enhanced in the direction normal to the alignment of the ribs because of the relatively greater cross-sectional area of the meld chambers, which enhances melding of the greater volume of molten plastic that has not cooled as much as the molten plastic next to the walls of the mold cavity. Accordingly the strength of the meld is enhanced by more than the proportion of the relative thicknesses of the meld chamber and the adjacent thin cavity region.

Even though the flexure strength of the ribs in a direction normal to the alignment of the ribs is not as great as the flexure strength in such direction within the area between the ribs when the product is bent along a line generally aligned with the ribs, the ribs are not subjected to as much stress when the product is so bent since the area between the ribs is thinner and bends to absorb most of the stresses applied by such bending.

The product also has flexure strength when bent in a direction generally normal to the alignment of the ribs because of the relative thickness of the ribs. As a result, the product is resistant to fracture when bent in any direction.

The term "thin-walled" is used in a relative sense to refer to the thickness of the wall of the product in relation to the overall size of the product.

Injected molded products according to the present invention include many products of diverse configurations, such as, but not limited to cups, boxes, coat hangers and boats, by way of example.

Additional features of the present invention are described with reference to the description of the preferred embodiments.

DESCRIPTION OF THE PREFERRED EMBODIMENTS

Figure 1:
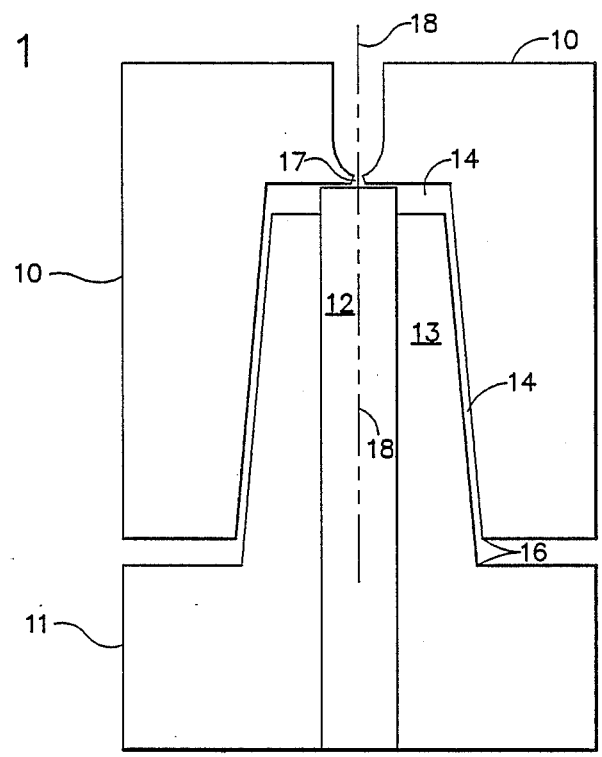
FIG. 1 is a schematic view of a mold used to make a preferred embodiment of the product of the present invention.

Referring to FIG. 1, a mold for use in making a product according to the present invention includes a hollow mold part 10 and a core mold part 11. The core mold part has a retractable inner portion 12 and an outer portion 13. When clamped together to form the mold, the hollow mold part 10 and the core mold part 11 define a mold cavity 14 therebetween for forming a hollow plastic product. The two mold parts 10, 11 are encompassed by a parting line 16 and further define a gate 17 for admitting molten injected plastic into the mold cavity 14. The mold cavity 14 is centered about an axis 18, and the gate 17 is axially disposed in the mold cavity 14. The retractable inner core portion 12 is axially-movable and when protracted, is in contact with the hollow mold part 10 adjacent the gate 17.

A mold defining such primary and secondary flow channels and the use of such a mold are the subject of U.S. patent application Ser. No. 007,462, entitled "Stabilized-Core Injection Molding of Hollow Thin-Walled Plastic Products" filed by the present inventor, Jens Ole Sorensen, on Jan. 26, 1987.

Figure 2:
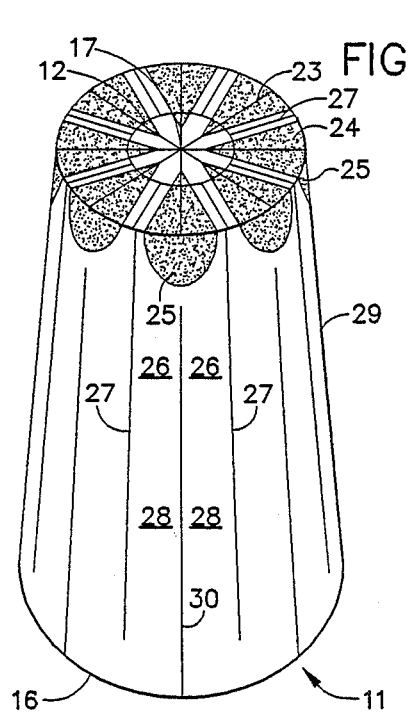
FIG. 2 illustrates a preferred embodiment of a core mold part for use in the mold of FIG. 1 for molding a hollow thin-walled plastic product.

Referring to the preferred embodiment of the core mold part 11 shown in FIG. 2, the mold parts 10, 11 define primary flow channels 23 extending from the gate 17. When the retractable inner portion 12 of the core mold part 11 is protracted, the primary flow channels 23 direct initially injected molten plastic 24 from the gate 17 to create stabilizing regions 25 of stiffened plastic, to thereby impede lateral deflection of the mold parts 10, 11 with respect to each other when additional molten plastic 26 subsequently is injected, whereby the side walls of the molded plastic product formed in the mold cavity 14 are uniformly dimensioned.

The mold parts 10, 11 further define secondary flow channels 27. When the retractable inner portion 12 of the core mold part 11 is protracted, the secondary flow channels 27 exist, but they are isolated from the gate 17. In the portion of the mold cavity 14 defined by the outer portion 13 of the core mold part 11, the secondary flow channels 27 are interposed between the primary flow channels 23. When the retractable inner core portion 12 of the core mold part 11 is retracted, the flow channels 27 are significantly thicker than the thin cavity regions of the mold cavity and the average wall-defining thickness of the mold cavity 14 and direct the subsequently injected molten plastic 26 between the stabilizing regions 25 of stiffened plastic and into the side-wall-defining regions 29 of the mold cavity 14, to thereby enhance the flow of the molten plastic into the side-wall-defining regions 29 of the mold cavity 14.

The side-wall-defining regions 29 of the mold cavity 14 include thin cavity regions 28 for defining the thin-walled areas of the plastic product. The secondary flow channels 27 define opposite boundaries of each thin cavity region 28, and direct the injected molten plastic from the gate 17 into the thin cavity region 28, whereby the molten plastic directed from one secondary flow channel 27 joins with the molten plastic directed from an adjacent secondary flow channel 27.

The mold parts 10, 11 further define meld chambers 30 having their thickest portions displaced from the gate 17 and the flow channels 23, 27 and interposed between the secondary flow channels 27 where molten plastic directed into each thin cavity region 28 by one secondary flow channel 27 joins molten plastic directed into the thin cavity region 28 by an adjacent secondary flow channel 27. Each meld chamber 30 is significantly thicker than the thin cavity region 28 for enabling molten plastic directed from one secondary flow channel 27 to meld with the molten plastic directed from the adjacent secondary flow channel 27. The meld chambers 30 extend to the parting line 16 of the mold.

Figure 3:
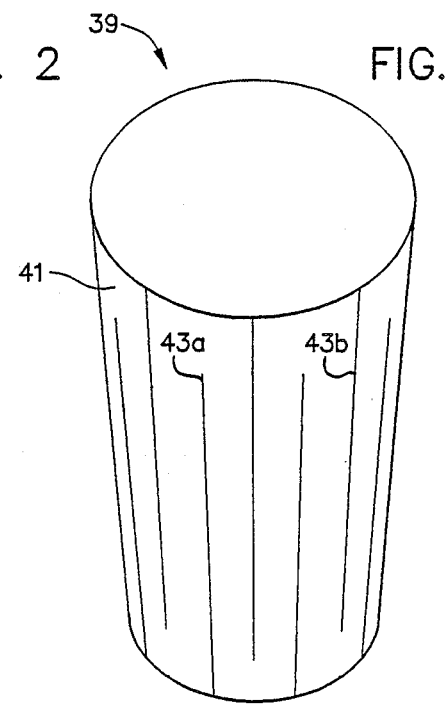
FIG. 3 illustrates a preferred embodiment of a thin-walled plastic product according to the present invention.

A thin-walled plastic product 39 molded by using a mold according to the present invention is illustrated in FIG. 3. In such embodiment the flow channels and meld chambers are defined by the hollow mold part.

The product 39 is a cup including a thin-walled area 41 having a plurality of protruding spaced-apart ribs 43a and 43b. The ribs 43a are formed by the secondry flow channels 27 and the rib 43b are formed by the meld chambers 30 of the mold cavity 14. The product 39 further includes a gate mark (not shown) formed at the gate 17 of the mold (FIG. 1).

The ribs 43b formed by the meld chambers 30 are at least partially located extensively between the ribs 43a formed by the flow channels 27. Each of the ribs 43a and 43b is thicker than the thin-walled area 41, and has one end that is closer to the gate mark than another end of such rib. The end of each rib 43b that is closest to the gate mark is separated from the gate mark by a greater distance than the ends of the ribs 43a that are closest to the gate mark. Also, the end of each rib 43b that is farthest from the gate mark is separated from the gate mark by a greater distance than the ends of the ribs 43a that are farthest from the gate mark.

Within the area of the wall between a pair of the ribs 43a and 43b, the flexure strength is greater in a direction normal to a line that is generally aligned with the direction of the pair of ribs 43a and 43b than in a direction parallel to said line.

In an alternative preferred embodiment, the core mold part does not include a retractable portion. In such embodiment, the base portion of the core mold part that is adjacent the gate defines the pattern of flow chambers and meld chambers shown in FIG. 4. The flow channels 40 and meld chambers 44 continue into the side-wall-defining regions of the core mold part 45.

Figure 4:
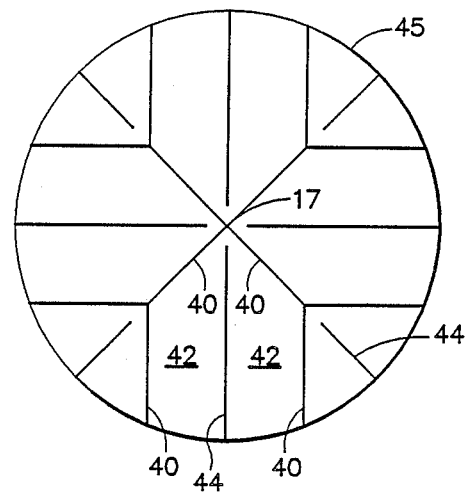
FIG. 4 illustrates a pattern of flow channels, thin cavity regions and meld chambers in a mold cavity defined by the base of the core mold part in an alternative preferred embodiment of the present invention.

Referring to FIG. 4, the mold parts define flow channels 40 which define opposite boundaries of thin cavity regions 42 and direct injected molten plastic from the gate 17 into the thin cavity regions 42. The molten plastic directed from one flow channel 40 joins with the molten plastic directed from an adjacent flow channel 40. The flow channels 40 are bifurcated in the base region so as to be uniformly disposed about the circumference of the core mold part to define uniformly dimensioned thin cavity regions in the side-wall-defining regions of the mold cavity 14, such as shown in FIG. 2.

The mold parts further define meld chambers 44 in the base region. The thickest portions of the meld chambers 44 are displaced from the gate 17 and the meld chambers 44 are located between the flow channels 40 where molten plastic directed into the thin cavity region 42 by one flow channel 40 joins molten plastic directed into the thin cavity region 42 by the adjacent flow channel 40. The meld chambers 44 are significantly thicker than the thin cavity region 42 for enabling the molten plastic directed from one flow channel 40 to meld with molten plastic directed from the adjacent flow channel 40.

Figure 5:
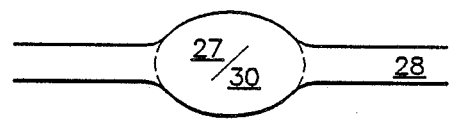
FIG. 5 illustrates a flow channel/meld chamber having an elliptical cross-sectional area as defined by depressions in both mold parts in one preferred embodiment of the present invention.
Figure 6:
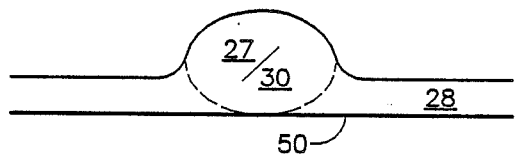
FIG. 6 illustrates a flow channel/meld chamber having an elliptical cross-sectional area as defined by a depression in one mold part in another preferred embodiment of the present invention.
Figure 7:
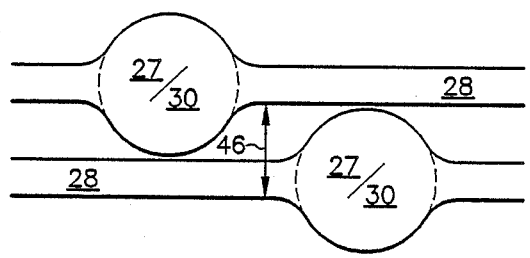
FIG. 7 illustrates the stacking of a pair of plastic products defined by a mold cavity having flow channels and/or meld chambers having circular cross-sectional areas defined by depressions in both the first and second mold parts.
Figure 8:
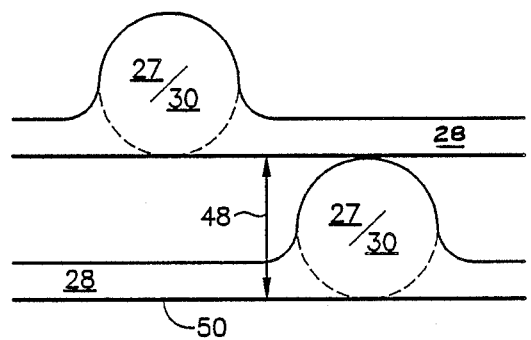
FIG. 8 illustrates the stacking of a pair of plastic products defined by a mold cavity having flow channels and/or meld chambers having circular cross-sectional areas defined by a depression in only one mold part.

The cross-sectional areas of the respective flow channels and meld channels have approximately the same cross-sectional area, and are elliptical as shown in FIGS. 5 and 6. A circular cross-sectional area is preferrd, as shown in FIGS. 7 and 8, for enhancing the meld. However, if the dimension of the ellipse normal to the breadth of the thin cavity region 28 is reduced in relation to its perpendicular dimension, the stacking height of conical-shaped products made with the mold, such as shown in FIG. 3, is minimized.

The stacking height of the products also may be minimized by defining the respective flow channels and the meld chambers by depressions in both the first and second mold parts, as shown in FIGS. 5 and 7. The relative stacking heights of products made with molds in which the flow channels and meld chambers are defined by depressions in both mold parts and products made with molds in which the flow channels and meld chambers are defined by depressions in only one mold part are illustrated in FIGS. 7 and 8 respectively. The respective distances 46 and 48 shown in FIGS. 7 and 8 are proportional to the respective stacking heights of such products. The embodiments of FIGS. 6 and 8 are preferred when it is desired to provide a molded product having a relatively uniform surface 50.

Figure 9:
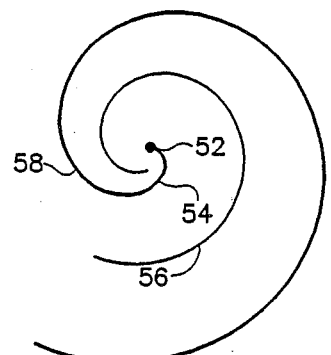
FIG. 9 illustrates a pattern of a nonlinear flow channel and a nonlinear meld chamber defined in a mold cavity in an alternative preferred embodiment of the present invention.
Figure 10:
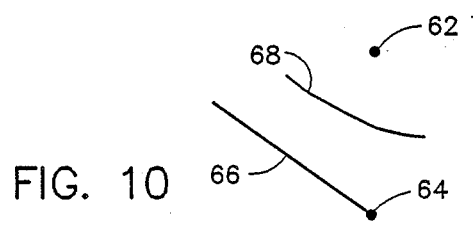
FIG. 10 illustrates a pattern of a plurality of gates, a flow channel and a meld chamber defined in a mold cavity in an alternative preferred embodiment of the present invention.

Alternative embodiments of different combinations of meld chambers, flow chambers and gates defined by the mold parts are shown in FIGS. 9 and 10.

Referring to FIG. 9, the mold parts define a gate 52, a nonlinear flow channel 54 connected to the gate 52, and a nonlinear meld chamber 56 located between the gate 52 and the flow channel 54 and between a first portion 58 and a second portion 60 of the flow channel 54 where molten plastic directed into the thin cavity region by the flow channel 54 joins with molten plastic admitted into the thin cavity region from the gate 52 and where molten plastic directed into the thin cavity region by the first portion 58 of the flow channel 54 joins with molten plastic directed into the thin cavity region by the second portion 60 of the flow channel 54.

FIG. 9 also depicts a product formed with such a mold. This product includes a gate mark 52, a rib 54 formed by a flow channel and a rib 56 formed by a meld chamber. In this product, the rib 56 formed by the meld chamber is at least partially located extensively between different portions 58, 60 of the rib 54 formed by the flow channel; and the end of the rib 56 that is closest to the gate mark 52 is separated from the gate mark 52 by a greater distance than the end of the rib 54 that is closest to the gate mark 54.

Referring to FIG. 10, the mold parts define a first gate 62, a second gate 64, a flow channel 66 connected to the second gate 64 and a meld chamber 68 located between the first gate 62 and the flow channel 66 where molten plastic admitted into the thin cavity region from the first gate 62 joins molten plastic directed into the thin cavity region by the flow channel 66.

FIG. 10 also depicts a product formed with such a mold. This product includes a gate mark 62, a rib 66 formed by a flow channel and a rib 68 formed by a meld chamber. In this product the rib 68 formed by the meld chamber is at least partially located extensively between the gate mark 62 and the rib 66 formed by the flow channel.

I claim:

1. An injection-molded, thin-walled, plastic product formed by a mold cavity having a thin-cavity region; first and second flow channels, which are thicker than the thin-cavity region for directing injected plastic into the thin-cavity region; and a meld chamber, which is thicker than the thin-cavity region, and is displaced from the flow channels and at least partially located extensively between the flow channels where molten plastic directed into the thin-cavity region by the first flow channel joins molten plastic directed into the thin-cavity region by the second flow channel for melding plastic flowing together from different directions after flowing through the thin cavity region, the product comprising
   a thin-walled area formed by the thin-cavity region;
   first and second ribs formed by the pair of flow channels, said first and second ribs being thicker than the thin-walled area; and
   a third rib formed by the meld chamber, wherein the third rib is displaced from the first and second ribs by the thin-walled area and is at least partially located extensively between the first and second ribs, said third rib being thicker than the thin-walled area.

2. An injection-molded, thin-walled, plastic product formed by a mold cavity having a thin-cavity region; a gate, a flow channel, which is thicker than the thin-cavity region for directing injected plastic into the thin-cavity region; and a meld chamber, which is thicker than the thin-cavity region, and is displaced from the flow channel and the gate and at least partially located extensively between the flow channel and the gate where molten plastic directed into the thin-cavity region by the first flow channel joins molten plastic directed into the thin-cavity region by the second flow channel for melding plastic flowing together from different directions after flowing through the thin cavity region, the product comprising
   a thin-walled area formed by the thin-cavity region;
   a gate mark formed at the gate;
   a first rib formed by the flow channel, said first rib being thicker than the thin-walled area; and
   a second rib formed by the meld chamber, wherein the second rib is displaced from the first rib and the gate mark by the thin-walled area and is at least partially located extensively between the gate mark and the first rib, said second rib being thicker than the thin-walled area 3. An injection-molded, thin-walled, plastic product formed by a mold cavity having a thin-cavity region; a nonlinear flow channel, which is thicker than the thin-cavity region for directing injected plastic into the thin-cavity region; and a meld chamber, which is thicker than the thin-cavity region, and is displaced from the flow channel and at least partially located extensively between different portions of the flow channel where molten plastic directed into the thin-cavity region by one portion of the flow channel joins molten plastic directed into the thin-cavity region by another portion of the flow channel for melding plastic flowing together from different directions after flowing through the thin cavity region, the product comprising

- a thin-walled area formed by the thin-cavity region;
- a nonlinear first rib formed by the flow channel, said first rib being thicker than the thin-walled area; and
- a second rib formed by the meld chamber, wherein the second rib is displaced from the nonlinear first rib by the thin-walled area and is at least partially located extensively between different portions of the first rib, said second rib being thicker than the thin-walled area.

4. An injection-molded, thin-walled, plastic product, comprising

- a gate mark;
- a thin-walled area;
- first and second ribs, which are thicker than the thin-walled area; and
- a third rib consisting of plastic which flowed together from different directions, which third rib is is at least partially located extensively between the first and second ribs, is thicker than the thin-walled area, and is displaced from the gate mark and the first and second ribs by the thin-walled area;
- wherein one end of each said rib is closer to the gate mark than another end of said rib; and
- wherein the end of the third rib that is closest to the gate mark is separated from the gate mark by a greater distance than the ends of the first and second ribs that are closest to the gate mark.

5. A product according to claim 4, wherein the end of the third rib that is farthest from the gate mark is separated from the gate mark by a greater distance than ends of the first and second ribs that are farthest from the gate mark.

6. An injection-molded, thin-walled, plastic product comprising

- a gate mark;
- a thin-walled area;
- first and second ribs, which are thicker than the thin-walled area; and
- a third rib consisting of plastic which flowed together from different directions, which second rib is at least partially located extensively between the first and second ribs, is thicker than the thin-walled area, and is displaced from the gate mark and the first and second ribs by the thin-walled area;
- wherein one end of each said rib is closer to the gate mark than another end of said rib; and
- wherein the end of the third rib that is farthest from the gate mark is separated from the gate mark by a greater distance than the ends of the first and second ribs that are farthest from the gate mark.

7. An injection-molded, thin-walled, plastic product, comprising

- a gate mark;
- a thin-walled area;
- a nonlinear first, which is thicker than the thin-walled area; and
- a second rib consisting of plastic which flowed together from different directions, which second rib is at least partially located extensively between different portions of the first rib, is thicker than the thin-walled area, and is displaced from the gate mark and the first rib by the thin-walled area;
- wherein one end of each said rib is closer to the gate mark than another end of said rib; and
- wherein the end of the second rib that is closest to the gate mark is separated from the gate mark by a greater distance than the end of the first rib that is closest to the gate mark.

* * * * *

UNITED STATES PATENT AND TRADEMARK OFFICE
CERTIFICATE OF CORRECTION

PATENT NO. : 4,807,775
DATED : February 28, 1989
INVENTOR(S) : Jens Ole Sorensen It is certified that error appears in the above-identified patent and that said Letters Patent is hereby corrected as shown below:

Column 8, line 23, change "first," to --first rib,--.

Signed and Sealed this

Seventeenth Day of December, 1991

Attest:

Attesting Officer

HARRY F. MANBECK, JR.

Commissioner of Patents and Trademarks